United States Patent [19]

Lieberman

[11] Patent Number: 5,570,142
[45] Date of Patent: *Oct. 29, 1996

[54] ASYMMETRIC ASPHERIC CONTACT LENS

[75] Inventor: David M. Lieberman, New York, N.Y.

[73] Assignee: Scientific Optics, Inc., New York, N.Y.

[*] Notice: The term of this patent shall not extend beyond the expiration date of Pat. No. 5,502,518.

[21] Appl. No.: 303,350

[22] Filed: Sep. 9, 1994

Related U.S. Application Data

[63] Continuation-in-part of Ser. No. 119,351, Sep. 9, 1993, Pat. No. 5,502,518.

[51] Int. Cl.$^6$ ........................................................ G02C 7/04
[52] U.S. Cl. ........................ 351/160 R; 351/161; 351/177
[58] Field of Search .......................... 351/160 R, 160 H, 351/161, 162, 177

[56] References Cited

U.S. PATENT DOCUMENTS

| | | | |
|---|---|---|---|
| 4,194,814 | 3/1980 | Fischer et al. | 351/160 R |
| 4,273,734 | 6/1981 | Seiderman | 351/160 H |
| 4,346,482 | 8/1982 | Tennant et al. | 623/6 |
| 4,408,845 | 10/1983 | Seiderman | 351/160 H |
| 4,563,565 | 1/1986 | Kampfer et al. | 351/160 R |
| 4,569,576 | 2/1986 | Karpov et al. | 351/212 |
| 4,580,882 | 4/1986 | Nuchman et al. | 351/161 |
| 4,640,595 | 2/1987 | Volk | 351/160 R |
| 4,665,913 | 5/1987 | L'Esperance, Jr. | 128/303.1 |
| 4,665,914 | 5/1987 | Tanne | 128/305 |
| 4,676,790 | 6/1987 | Kern | 623/5 |
| 4,680,998 | 7/1987 | Council, Jr. | 51/124 L |
| 4,715,858 | 12/1987 | Lindstrom | 623/5 |
| 4,884,482 | 12/1989 | Council, Jr. | 51/124 L |
| 4,947,715 | 8/1990 | Council, Jr. | 51/124 L |
| 4,995,300 | 2/1991 | Kaplan et al. | 82/12 |
| 5,019,097 | 4/1991 | Knight et al. | 623/5 |
| 5,110,200 | 5/1992 | Snook | 351/212 |
| 5,152,786 | 10/1992 | Hanna | 625/5 |
| 5,163,956 | 11/1992 | Liu et al. | 623/4 |
| 5,166,710 | 11/1992 | Hofer | 351/160 R |
| 5,170,191 | 12/1992 | Jones | 351/160 H |

OTHER PUBLICATIONS

Corneal Topography and Contact Lenses Is There a 'Fit; By: Michael L. Gilbert, M.D. Spring, 1993.

Autorefractor/Keratometers; By: Stephanie Kloos Donoghue, Spring 1993: *Eyecare Technology*.

DAC Three Axis Iol Air Bearing Mill DLM Series II, Aug. 1993.

Primary Examiner—Scott J. Sugarman
Attorney, Agent, or Firm—Darby & Darby, P.C.

[57] ABSTRACT

A contact lens for use on a patient's eye with an asymmetric aspheric cornea, the lens having an anterior surface, a posterior surface and a base, the posterior surface having a peripheral portion which is asymmetric and aspherical and at least coextensive with the base of the lens. The peripheral portion asymmetrically and aspherically matching a corresponding peripheral portion of the cornea which lies under the peripheral portion of the lens when the lens is worn in the patient's eye. The contact lens is not substantially greater in diameter than said cornea. The process for manufacturing the lens uses three-dimensional topographic data (including elevation data) from a multiplicity of points on the cornea. The data is used to shape at least the peripheral portion of the posterior surface of the lens to cause it to conform to and/or match the corresponding surface of the cornea.

20 Claims, 8 Drawing Sheets

ASYMMETRIC ASPHERIC CONTACT LENS

This is a continuation-in-part of U.S. application Ser. No. 08/119,351 filed Sep. 9, 1993 now U.S. Pat. No. 5,502,518.

FIELD OF THE INVENTION

The present invention relates generally to contact lenses and to methods of manufacture of contact lenses, and in particular to asymmetric, aspheric individually fitted contact lenses and methods of manufacture thereof.

BACKGROUND OF THE INVENTION

Thirty to forty percent of the human population under age 40 develop an ocular refractive error requiring correction by glasses, contact lenses, or surgical means. Refractive errors result when the primary optical elements of the eye, the cornea and the lens, fail to image incoming light directly on the retina. If the image is focused in front of the retina, myopia (nearsightedness) exists. If the eye image is focused behind the retina, hyperopia (farsightedness) exists. The focusing power of the eye or any refracting medium is measured in units called diopters.

Approximately 20% of the patients under 40 having vision defects cannot wear contact lenses because the contact lenses do not fit (become dislodged and/or are very uncomfortable), or they fail to provide the requisite optical correction, or both. In addition, many patients who currently wear contact lenses are not satisfied with the length of time they can wear their lenses and/or with the visual acuity their contact lenses provide.

Over age 40, the percentage of the population requiring vision correction dramatically increases and the problems encountered with existing contact lenses become much more common and acute.

Standard contact lenses are rotationally symmetrical and spherical. The human cornea, however, is an "asymmetrically aspheric" surface.

"Aspheric" means that the radius of curvature along a corneal "meridian" (which is an imaginary line on the corneal surface passing through the geometric center of the cornea, analogous to a geographic meridian) is not a constant. Indeed, the corneal curvature flattens progressively from the geometric center to the periphery. "Asymmetric" means that the profile of the corneal curvature along a half-meridian is not the same as (i.e., it is not a mirror image of) the other half of the same meridian. The degree to which corneas are aspheric and/or asymmetrical varies from patient to patient.

Spherical lenses do not match the corneal curvature and geometry, and therefore do not fit properly. The more irregular the patient's cornea the worse the fit, such that about 20% of the patients under age 40 are unable to wear standard contact lenses.

Standard contact lenses are rotationally symmetrical. The contact lens designer/fitter routinely combines a multiplicity of spheres or adds aspheric curves in conventional contact lens design. Sometimes the fitter will generate toric, bitoric and like surfaces in his efforts to fit lenses to the cornea. These more complicated lens designs remain inherently rotationally symmetric, i.e., the surfaces are generated about a central point of revolution. Toric lenses are currently made in one of two ways. The first and most common method is to crimp and thus distort the lens blank before placing it in the lathe. After the crimped lens is cut, it is allowed to spring open. The second method is to make the toric lens directly on a lathe.

Because the human cornea has an asymmetrically aspheric surface, purely spherical lenses poorly match the corneal curvature and geometry. When the lens is designed as a hybrid of spherical and aspherical curves, the resultant lens surfaces are still rotationally symmetrical (i.e., these lenses are not asymmetrical and aspheric).

In an effort to alleviate these problems, manufacturers developed lenses with varying curvatures on their posterior surface. For example, U.S. Pat. No. 5,114,628 discloses aspherical contact lenses made using corneal topographic data to control a lathe. (The data provide information on the slope of the corneal surface at different points on the cornea but are based on measurements in two dimensions interpreted three-dimensionally.) The resultant lens is aspherical (in both the anterior and posterior surface) but inherently symmetrical. Such a lens may fit some patients better than the standard spherical lenses. But other patients may experience more discomfort than with the spherical lenses. Thus, this type of aspherical symmetric lens does not provide a substantial improvement in the number of patients that can comfortably wear contact lenses and/or wear contact lenses that provide them with the requisite visual acuity.

Other U.S. patents (e.g., U.S. Pat. Nos. 4,923,467, 5,104,408 and 5,156,622) disclose the shaping of a lenticule which is implanted within the substance of the cornea. These lenticules are not contact lenses. The lenticules described in these patents are shaped based on corneal topographic mapping data. A laser is used to ablate material from a lens blank. However, the fit problems encountered with these implants are not the same as those encountered with contact lenses. For example, unlike a contact lens, implanted lenticules are stationary and once installed in the corneal stroma they neither "rock" on the cornea nor float on a tear film and are not subject to external forces such as eyelid pressure or the force of gravity.

U.S. Pat. No. 2,264,080 to Hunter discloses a system for manufacturing a "contoured" scleral contact lens, i.e., a lens resting on the sclera, not on the cornea. Hunter teaches the creation of a mold of the surface of the eye which is then used as a "template" to mechanically radially guide a grinder over the surface of a lens blank. The grinder receives information about the meridional topography of the mold and travels over the surface of the lens blank in a back-and-forth fashion along meridians of the lens. Hunter's scleral lens intentionally has sufficient clearance from the cornea to avoid any contact with the surface of the cornea. Moreover, his method of manufacture causes "ridges" or "cusps" to be formed on the posterior surface of the lens, which if present on a contact lens closely fitted to the cornea would cause discomfort to the wearer. Additionally, these ridges would be present in the optical field portion of a contact lens, obstructing the patient's field of vision and thereby rendering the contact lens useless.

The need in the art for better fitting contact lenses is illustrated in an article in *Ophthalmology Times* Nov. 1, 1992, p. 82, which discloses that future areas of research will involve increasingly sophisticated aspheric optics and refinements on contact lenses based on the asphericity of the cornea.

In other words, although both the asphericity and asymmetry of the cornea may have been recognized in the art, only the asphericity of the cornea has been taken into account in contact lens design. The present inventor unexpectedly discovered, that if part of the contact lens accurately mimics the surface of the cornea in both asphericity and asymmetry, a better fit and/or a better vision correction can be achieved consistently. Thus, there is a need in the art for a contact lens that will decrease or eliminate the number of patients of all ages who currently cannot wear contact lenses, and provide better comfort and/or visual acuity (including better correction of astigmatism) for patients who now wear contact lenses.

OBJECTS OF THE INVENTION

It is therefore one object of the present invention to provide a contact lens with a more accurate vision correction and/or a more comfortable fit to the patient's cornea.

It is another object of the invention to rapidly and economically manufacture custom fit contact lenses, which are either spherical or aspherical, but are inherently asymmetric.

SUMMARY OF THE INVENTION

One aspect of the invention is directed to a contact lens for use on a patient's eye with an asymmetric aspheric cornea, said lens having: an anterior surface, a posterior surface and a base, said posterior surface comprising a peripheral portion, which is asymmetric and aspherical and at least coextensive with the base of said lens;

said peripheral portion asymmetrically and aspherically matching a corresponding peripheral portion of the cornea which lies under said peripheral portion of the lens when the lens is worn in the patient's eye; and said contact lens is no greater in diameter than said cornea.

More specific embodiments include without limitation one or more of the following variations:

(a) the entire posterior surface asymmetrically and aspherically corresponds to the surface of the cornea;

(b) the anterior surface of the lens may also be asymmetric and aspherical in whole or in part;

(c) at least part of the peripheral portion of the posterior surface of the lens has asphericity and asymmetry in a predetermined proportionally divergent relationship with the corneal surface;

(d) the central portion of the posterior surface of the lens is spherical; and/or (e) the peripheral edge portion of the lens has a variable thickness to permit for variations in symmetry and sphericity of the cornea while maintaining a conventional anterior edge and surface design.

In another aspect, the present invention provides a process for manufacturing the lens using three-dimensional topographic data (including elevation data) from a multiplicity of points on said cornea and using said data to guide the generation of at least the peripheral portion of the posterior surface of said lens to cause it to conform to and/or match the corresponding surface of said cornea.

BRIEF DESCRIPTION OF THE DRAWINGS

The features and advantages of the present invention will be more fully understood from the following description of preferred embodiments with reference being made to the drawings in which.

DETAILED DESCRIPTION OF PREFERRED EMBODIMENTS

The following terms are assigned the meanings described below:

(a) "Match" applied to corneal and lens surfaces means "fit essentially exactly". Thus, if a contact lens surface or portion "matches" the corresponding portion of the corneal surface, the three-dimensional topography of the lens surface or portion is essentially (or even exactly) superimposable on the three-dimensional topography of the corresponding corneal surface portion (generally, the more measurements of the corneal topography which are taken, the more exact the match).

(b) "Conform" applied to corneal and lens surfaces (or portions) is broader than "match". Thus, a surface portion of a lens "conforms" to a corresponding surface portion of the cornea if their three-dimensional topographies are not superimposable but the topography of every point on the lens surface is derived from a topography superimposable on the corneal surface by operation of a simple mathematical relationship. For example, a lens surface portion "conforms" to a corresponding corneal surface portion by a radially "proportionally divergent" relationship if the two surface portions have a "matching" boundary (i.e., a matching contour line) at the periphery but progressively diverge from one another in a radially inward direction. See, e.g., Zone 101 of cornea 10" and the same zone 101 of lens 60' in FIG. 8.

In order to appreciate the unique features and advantages of the contact lens and method of manufacture of the present invention, it is helpful to understand the structure of the cornea and the interaction of the cornea with the prior art contact lenses. FIGS. 1a through 1d illustrate various prior art contact lenses fitted to variously shaped hypothetical corneas. The depictions in these Figures are not to scale and certain structures have been exaggerated for illustrative purposes. Each of the cross sections of the eye depicted in FIGS. 1a–1d have been taken across a single meridian of the eye.

Figure 1A:
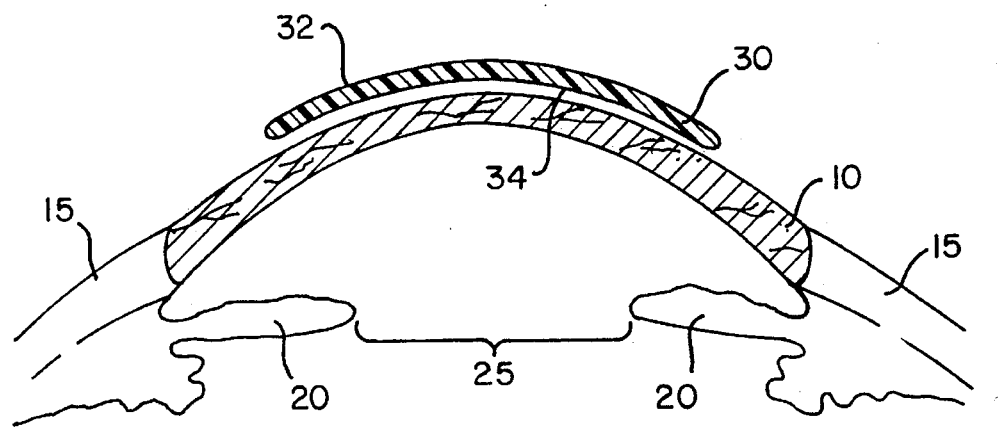
FIG. 1a is a cross-sectional view of a spherical cornea fitted with a prior art spherical lens.

FIG. 1a depicts a cross section of a hypothetical spherical cornea 10 which has been fitted with a spherical contact lens 30 of the prior art. (This illustration does not have any clinical basis since no human cornea is perfectly spherical.) In this Figure, it can be seen that if the human eye were perfectly spherical it could be easily fitted with a spherical lens 30. In a spherical lens, the radius of curvature at any point on the surface of the lens is equal to the radius of curvature at any other point on the same surface of the lens. Moreover, a sphere is inherently symmetric.

The optical correction achieved by a contact lens is, inter alia, a function of the power of the lens. In turn, the power of a lens is, inter alia, a function of the index of refraction of the material used for the lens and the algebraic difference between the curvature of the anterior (outer) surface 32 of the lens and the curvature of the posterior (inner) surface 34 of the lens. (For additional details on considerations that may be taken into account for achieving a given optical correction, see, e.g., U.S. Pat. No. 5,114,628, incorporated entirely by reference.)

Also seen in this FIG. 1a are other anatomical features of the eye including the sclera 15, the iris 20 and the pupil 25. The pupil 25 is the opening formed by the iris 20. As more light is required to enter the eye in order to form an image, the iris 20 opens and the diameter of the pupil grows larger. The lens 30 depicted in FIG. 1a covers at most the entire cornea 10, and has a diameter of up to approximately 10 millimeters. Some lenses of the prior art (not shown) have a much larger diameter and extend to cover part of the sclera 15, but the present invention concerns contact lenses that do not extend substantially past the edge of the cornea.

Figure 1B:
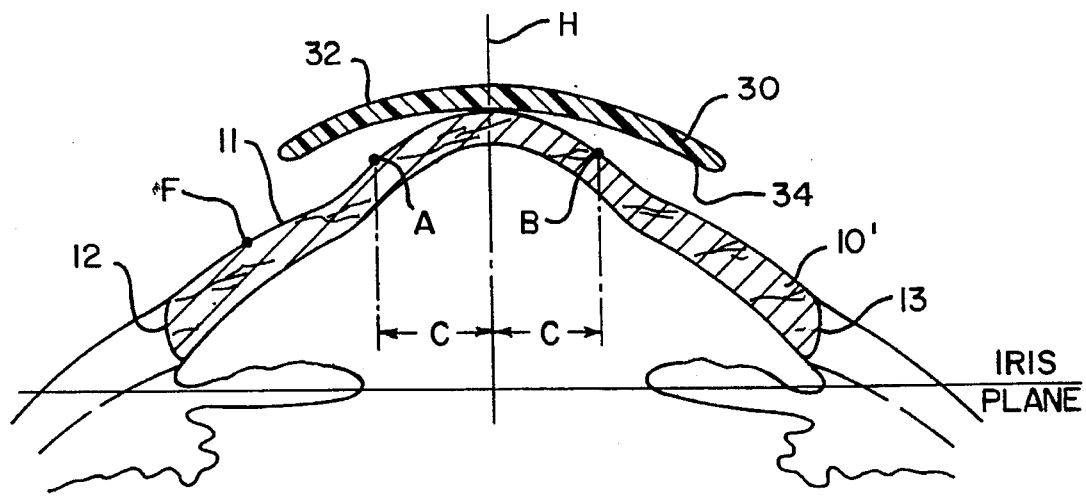
FIG. 1b is a cross-sectional view of a simple aspherical cornea fitted with a prior art spherical lens.

FIG. 1b is a cross-sectional view of a hypothetical symmetric aspherical cornea 10' fitted with the prior art spherical lens 30 of FIG. 1a. Geometric centerline H is an axis which is normal to the Iris Plane and passes through the geometric center of cornea 10'. In an aspherical cornea, such as the cornea 10' depicted in this Figure, the radius of curvature is not constant along any meridian, e.g., from a point on the geometric centerline H to either of its edges 12 or 13. For example, the radius of curvature at point A on the cornea 10' is different from the radius of curvature of the cornea 10' at point F. The radii of curvature depicted in FIG. 1b have been exaggerated in order to illustrate the asphericity of cornea 10'. It can be thus appreciated that a spherical lens 30 does not fit well nor rest stably on a symmetric aspherical cornea 10'. There will always be significant "gaps" (i.e., areas of nonconformity) between the posterior surface 34 of the lens 30 and the anterior surface 11 of the cornea 10'. Because of these gaps, there will be undesirable movement and "rocking" of the lens 30 on the cornea which, depending on the degree of movement/rocking, will render the lens 30 uncomfortable and/or ineffective in correcting vision.

Figure 1C:
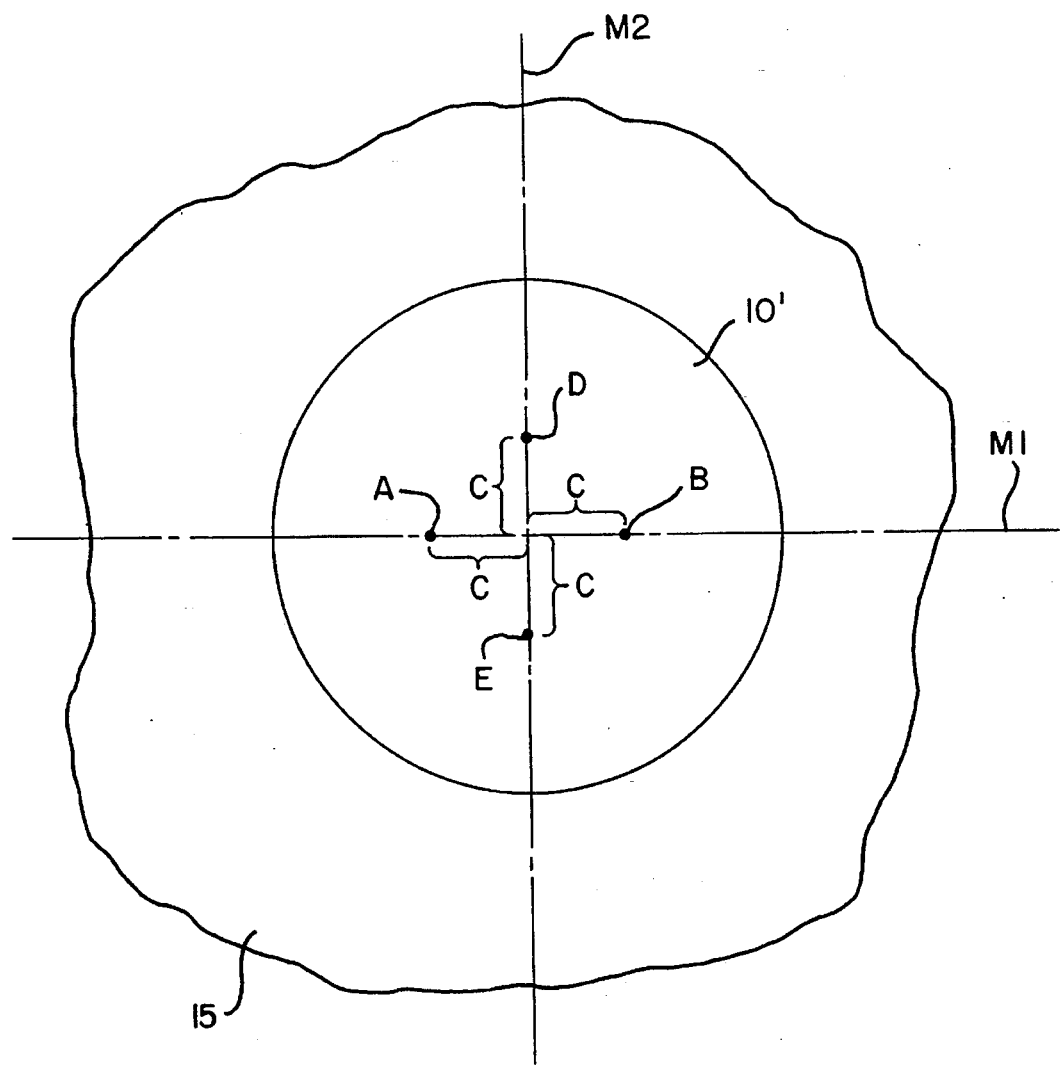
FIG. 1c is a plan view of the simple aspherical cornea of FIG. 1b.

The term "symmetric", defined above, has been used to describe the nature of the shape of the aspherical cornea 10'. A feature of the symmetric cornea is that the radius of curvature at a point located at a given radial distance from the geometric centerline H, is the same as the radius of curvature at any other point located at the same radial distance from the centerline H. FIG. 1c in conjunction with 1b illustrates this feature. FIG. 1c is a plan view of the symmetric aspherical cornea 10' of FIG. 1b. Points A and B both reside on the anterior surface 11 of cornea 10' along the same meridian M1. Points A and B are both at a radial distance C from the geometric centerline H of cornea 10', each in a different direction along meridian M1 from geometric centerline H. Points D and E reside along meridian M2 which is angularly displaced 90 degrees from meridian Mi. Points D and E are also each a radial distance C from geometric centerline H. In a symmetric aspheric cornea, the radius of curvature is the same at points A, B, D and E, all radially equidistant from centerline H. Any two halves of the cornea 10' are mirror images of each other taken along any meridian (e.g., M1, M2 or any other meridian).

Figure 1D:
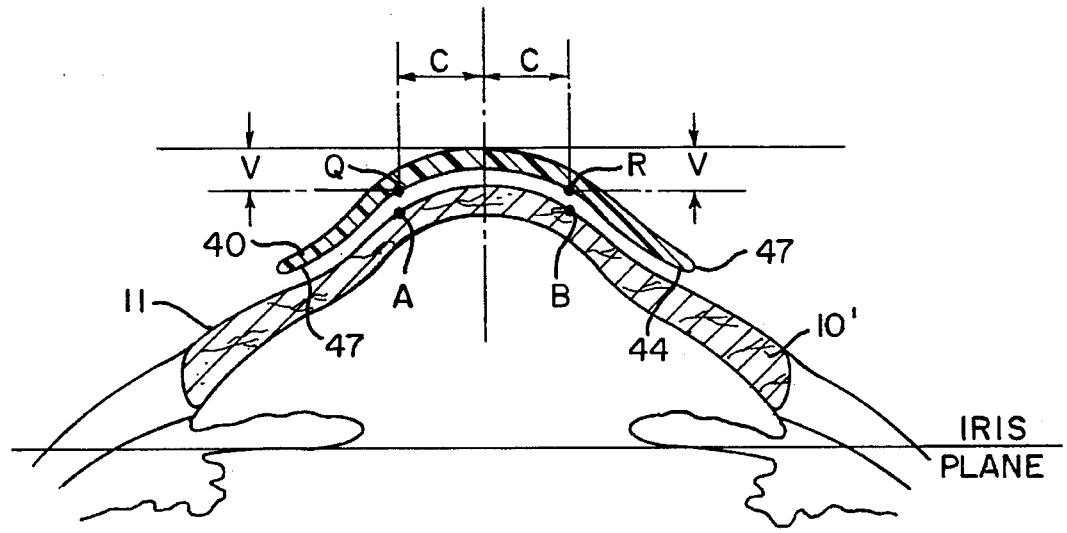
FIG. 1d is a cross-sectional view of a simple aspherical cornea fitted with a prior art simple aspherical lens.

FIG. 1d illustrates a cross section taken across a meridian of the symmetric aspherical cornea 10' fitted with a prior art symmetric aspherical lens 40 (which can be manufactured by conventional lathing techniques). As can be seen in this Figure, the curvature of the posterior surface of lens 40 has been constructed to conform to the curvature of the cornea 10'. As compared with the spherical lens of FIG. 1b, the aspherical lens 40 of this Figure provides a better fit for the aspherical symmetrical cornea of FIG. 1d which would result in improved comfort and vision. However, symmetric aspherical lenses, which have the same meridian cross-sectional shape throughout, whose shape corresponds to the patient's average corneal asphericity, still leave a sizable percentage of the patient population unable to wear them comfortably or see well enough through them.

FIG. 1d also is useful in explaining the deficiencies of a symmetric aspheric lens 40 when worn on an asymmetric aspheric cornea. Q and R are points on the posterior surface 44 of lens 40 along a particular meridian. Points Q and R are both at the same radial distance C from the geometric centerline H of cornea 40. In a symmetric aspheric lens 40 fitted to a symmetric aspheric cornea, points Q and R are the same distance (S), away from a plane P. Plane P is a reference plane which is parallel to the Iris Plane. Centerline H is normal to reference plane P. All points on the lens 40 located at a radial distance C from geometric centerline H will be a distance V away from plane P. In other words the same geometry described above with respect to the symmetric aspheric cornea 10 is present on the symmetric aspheric lens 40. Therefore, points Q and R on the lens 40 will perfectly match points A and B on the cornea 10'. Indeed, the entire posterior surface of the lens depicted in FIG. 1 d will match the corresponding surface of the cornea 10' which the lens 40 covers. This is to say that no gaps exist between points Q and A or points R and B. A uniform narrow space exists between the posterior surface 44 of lens 40 and the anterior surface 11 of cornea 10'. In actual practice, this uniform capillary space would be occupied by a tear film. Tear flow and tear exchange through this space is influenced by the capillary effect.

In FIG. 1d the lens is depicted positioned on the cornea such that the geometric centerline H of the cornea 10' coincides with the geometric centerline of the lens 40 and a single centerline H has been depicted to represent both geometric centerlines in this Figure and those which follow.

Figure 1E:
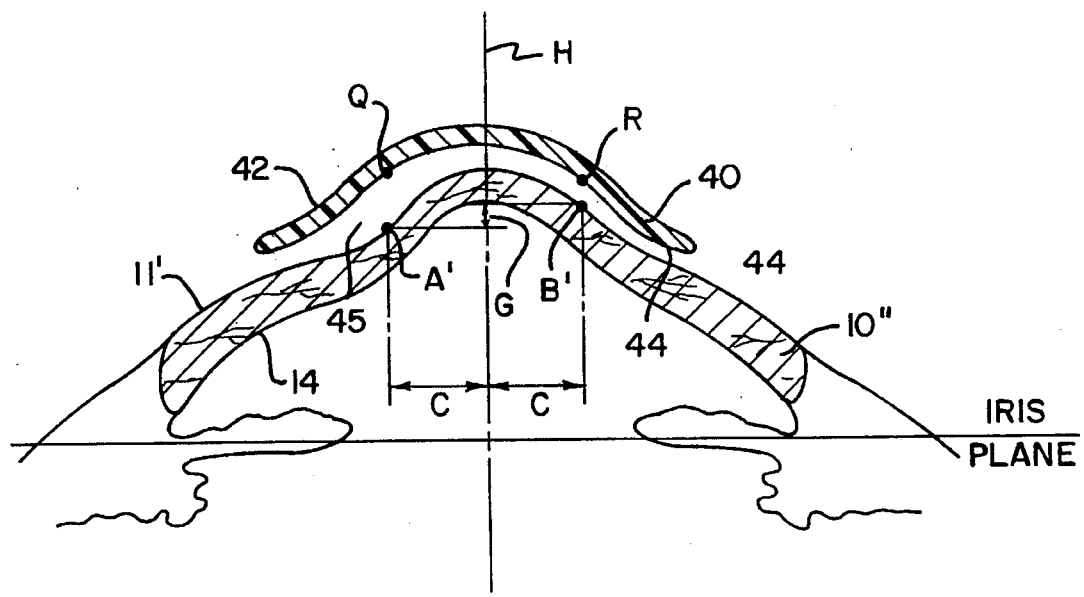
FIG. 1e is a cross-sectional view of an asymmetric aspherical cornea fitted with a prior art simple aspherical lens.

Unfortunately, a patient's cornea is highly unlikely to be symmetrically aspheric, as depicted in FIGS. 1b–1d. By far, the typical patient has a cornea which is both asymmetric and aspherical such as cornea 10" illustrated in FIG. 1e. FIG. 1e depicts the asymmetric aspheric cornea 10" fitted with the prior art symmetric aspheric lens 40 of FIG. 1d. As expected, the symmetric aspheric lens 40 does not match the asymmetric aspheric cornea 10" as well as it fits the symmetric aspheric cornea 10' of FIG. 1d.

Both points A' and B' in FIG. 1e lie along the same meridian of the cornea 10" at the same radial distance C away from geometric centerline H. Because of the asphericity of cornea 10", points A' and B' reside at different elevations from the Iris Plane. The difference in elevation between points A' and B' is shown as distance G. The elevational difference G between two points on the same meridian will render exact fitting of a symmetrical aspheric contact lens 40 on a asymmetrical aspheric cornea 10" impossible.

As seen in FIG. 1e, there exists a significant gap 45 between point A' on the anterior surface 11' of cornea 10" and the corresponding point Q on the posterior surface 44 of lens 40. When manufacturing the symmetrical lens 40, sufficient material is removed from the lens blank such that the lens will clear the highest elevation point at a given radius. In the particular example depicted in FIG. 1e, lens blank material has been removed at point R so that the lens 40 will not impinge on the cornea at point B'. Because the lens is symmetrical, point Q on lens 40 is at the same elevation as point R and it will therefore not match (elevationally) point A' on the cornea, and gap 45 results. The location, relative size, shape and number of gaps such as 45 determines whether it will be feasible to fit a patient with a symmetric aspheric contact lens such as lens 40 and whether, if feasible, the fit will be satisfactory. If a gap occurs at the marginal edge 47 (or base) of lens 40, which is the portion of lens 40 resting on the cornea, such as gap 46, the lens will tend to "rock" along the meridian containing the gap (or will rest on the cornea in a position at which the lens 40 and the cornea 10" will be optically misaligned). With a symmetrical lens such as lens 40, it is inevitable that gaps such as gap 46 will occur around the marginal edge 47 because of elevational differences in the corneal surface where the marginal edge 47 meets the cornea. Furthermore, because of gap 46, there are potential problems with the eyelid catching the marginal edge 47 and displacing the lens 40. The marginal edge 47 will appear to be raised from the surface of the cornea 11' due to gap 46 between the surface 11' and the lens 40. A further problem with gaps such as gap 45 (which are not created by design but by the failure of the design and method to account for certain features of the cornea) is the uncontrolled pooling of the tear film between the cornea and the posterior surface of the lens. If tear pooling is excessive, the lens may be so uncomfortable so as to make it virtually impossible for a patient to wear. Similarly, if the lens physically touches the central cornea, the corneal physiology will be so interrupted as to induce the cornea into an oxygen poor state which will become immediately apparent to the patient. If such an intolerable situation were to occur, the lens must be immediately removed from the eye.

Figure 2:
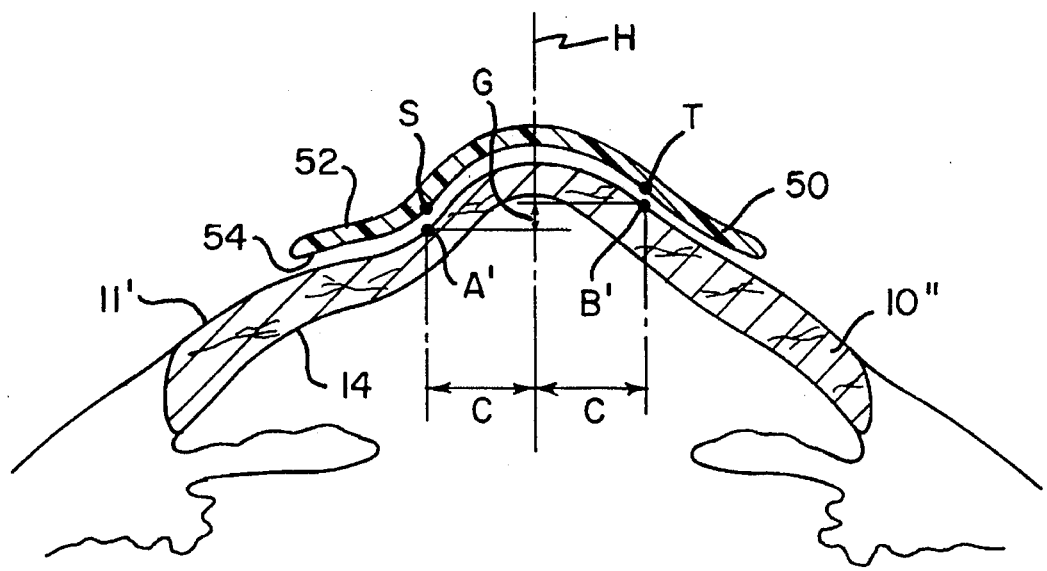
FIG. 2 is a cross-sectional view of an asymmetric aspherical cornea fitted with an asymmetric aspherical lens according to the present invention.
Figure 3:
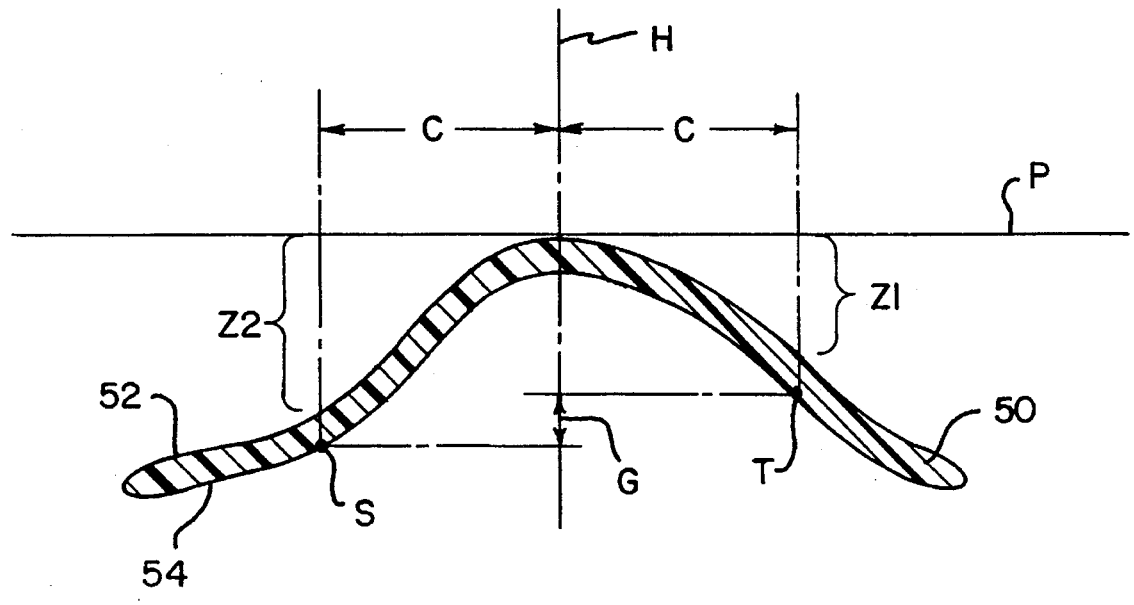
FIG. 3 is an enlarged cross-sectional view of the asymmetric aspherical lens of FIG. 2.

FIG. 2 illustrates a cross section of the asymmetric aspherical cornea 10" fitted with an asymmetric aspherical contact lens 50 to illustrate one aspect of the present invention. The anterior surface of asymmetric aspherical lens 50 is manufactured to conform precisely to (i.e., to match) the geometry of the asymmetric astigmatic cornea 10". The lens 50 is shown in greater detail in FIG. 3. As seen in FIG. 3, the lens 50 of the present invention has been made such that the posterior surface 54 of the lens 50 matches the asymmetric aspheric geometry of the anterior surface 11 of cornea 10". In practice, the center area (optical zone) will not match the cornea and only the periphery will match the cornea, as will be described below.

Points S and T in FIG. 3 lie along the same meridian on the posterior surface 54 of lens 50, and are both at the same radial distance C from the geometric centerline H of lens 50. Geometric centerline H is normal to reference plane P. Since the posterior surface 54 of the lens 50 has been made to match the irregular, asymmetric, asphericity of cornea 10", points S and T (equidistant from centerline H) reside at different elevations with respect to reference plane P. Point T is at a distance Z1 from plane P while point S is at a distance Z2 from plane P. Because of the asymmetry of lens 50, distance Z2 is greater than distance Z1, the difference being G. Assuming that the cross section of lens 50 depicted in FIG. 3 is taken along the same meridian as the cross section of cornea 10" in FIGS. 1e and 2, point S on lens 50 corresponds to point A' on the cornea 10" and point T on lens 50 corresponds to point B' on cornea 10", since all four points are the same radial distance C from geometric centerline H of the lens 50 and the cornea 10".

The geometry of posterior surface 54 of lens 50 has been made to conform to the topography of anterior surface 11" of cornea 10", and therefore the elevational difference G between points S and T on the lens 50 is the same as the elevational difference G between points A' and B' on the cornea 10". In comparison to the symmetric aspheric lens 40 depicted in FIG. 1e, the asymmetric aspheric lens 50 will not have any significant gaps between it and the cornea 10", such as gaps 45 and 46 in FIG. 1e. The thin uniform apparent gap depicted between posterior surface 54 of lens 50 and anterior surface 11" of cornea 10" (FIG. 2) is merely to show that, in practice, the posterior surface of lens 50 will be separated from cornea 10" by a thin tear film.

The anterior surface 52 of lens 50 is also shaped to be both aspherical and asymmetric so that, in conjunction with the posterior surface, it will achieve the proper optical correction required by the patient. As appreciated by one skilled in the art, the optical correction achieved by a contact lens is in part a function of the index of refraction of the material used for the lens and the algebraic difference between the curvature of the anterior surface 52 and the curvature of the posterior surface 54 of lens 50. The anterior surface 52 will be asymmetrically aspheric and will have a shape that will have a predetermined relationship to posterior surface 54 depending on the optical correction required (this feature is not shown in FIGS. 2 or 3). This relationship is determined by taking into account various optical considerations which are within the skill in the art. For examples of contact lenses using aspheric optics and further discussion thereof, see U.S. Pat. Nos. 5,019,098, 4,861,152 and 4,640,595.

Figure 4:
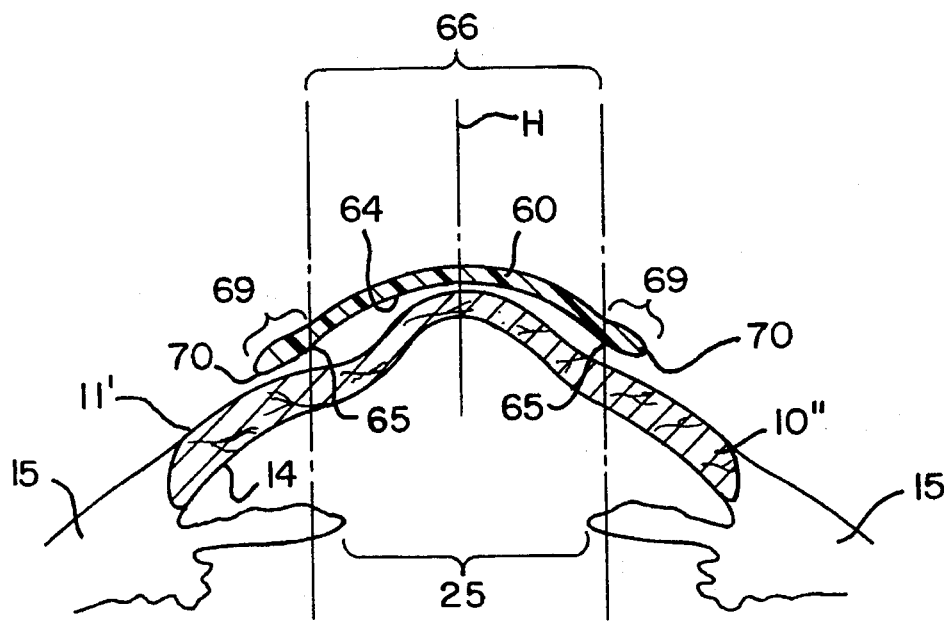
FIG. 4 is a cross-sectional view of an asymmetric aspherical cornea fitted with a combination spherical and asymmetric aspherical lens according to the present invention.
Figure 5:
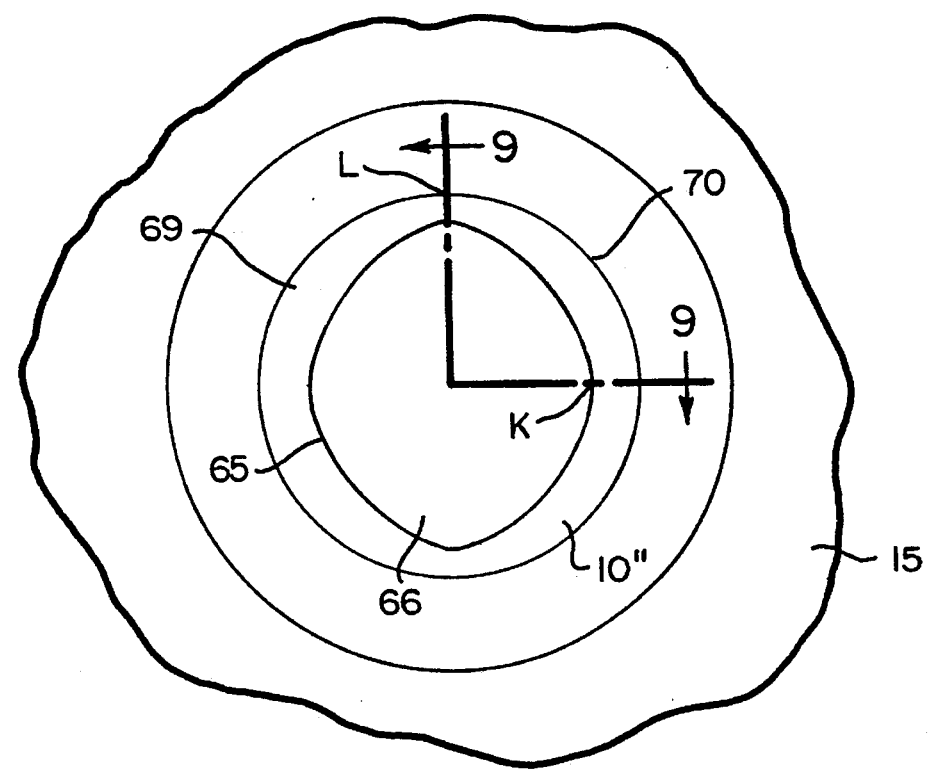
FIG. 5 is a plan view of the combination spherical and asymmetric aspherical lens of FIG. 4 fitted to a cornea.

A preferred embodiment of a contact lens according to the present invention is illustrated in FIGS. 4 and 5. Lens 60 depicted in these Figures is a combination lens having a spherical central portion 66 and an asymmetric aspherical peripheral or rim portion 69. The peripheral portion 69 includes the base 70 of lens 60 and extends to the base curve 65 of spherical portion 66. The geometry of central portion 66 of lens 60 is intentionally chosen to be spherical because spherical optics are relatively simple and achieve the best sight correction. The peripheral portion 69 of posterior surface 64 of lens 60 is shaped according to the corneal topographic data to create an asymmetrically aspheric surface which matches the topology (both in curvature and elevation) of anterior surface 11' of cornea 10". The peripheral portion 69 forms the bearing surface upon which lens 60 rests on the cornea 10".

The average maximum physiological dilation of the human pupil (25) is approximately four to five (4–5) millimeters. In a preferred embodiment of the present invention, central spherical portion 66 will have a base diameter of at least six (6) millimeters in order to provide optical connection over the entire optical zone created by dilated pupil 25. In this preferred embodiment, the width of peripheral asymmetric aspheric zone 69 will not likely exceed approximately one to two (1–2) millimeters. Although it is possible that peripheral portion 69 will have a uniform width, this is not necessarily the case, as illustrated in FIGS. 4 and 5. The width of the peripheral portion 69 can vary from location to location around the base of the lens. In such cases, the lens is not necessarily of a round shape or configuration. One factor which influences the width of the peripheral portion at a particular location is the steepness of the cornea at that particular location. If the cornea is very steep along a particular meridian, the width of the marginal area 69 can be increased to provide a larger bearing surface as at point K of FIG. 5. A flatter portion of the cornea can be accommodated with a narrower peripheral portion 69 and a correspondingly smaller bearing surface as at point L. At the limit, and assuming the corneal topography permits, the width of the peripheral portion 69 can be coextensive with the base 70 of lens 60. In practice, the base will not be a mathematical line but will have a small but finite width. The upper limit of portion 69 along a particular meridian is determined by the shape of the base curve 65 as described herein (and the existence, if any, of an intermediate zone as in FIG. 8). The lower limit, or edge, is determined not only by the topography of the cornea but also by taking into account the properties of the material from which the lens is made, tear flow considerations, and lens/eyelid interactions. In other words, the fine features of the meridian profile of lens 60 at the tip of base 70, wherein the posterior and anterior surfaces meet, will be subject to these additional considerations. Such edge design and edge lift determination is within the skill of the art, however, and will require no more than routine experimentation.

In FIG. 5, zones 66 and 69 have been shown as delineated by a sharp line. In an actual contact lens manufactured according to the present invention, the transition between spherical zone 66 and asymmetric aspheric zone 69 will be blended (i.e. smooth without sharp edges which may cause discomfort). The steepness of the transition at this interface is also dependent upon the relative steepness of the patient's cornea. A cornea with a steeper curvature will result in a lens with a steeper transition zone between the central spherical portion 66 and the peripheral asymmetric aspheric zone 69.

As will be appreciated by one skilled in the art, the radius of curvature for spherical central portion 66 is determined by the difference between the elevation of the apex of the cornea (the point on the cornea most distal from the iris plane) and the elevation of the highest point on the cornea at what will be boundary 65 between central portion 66 and peripheral portion 69. To ensure clearance over the entire cornea 10", the highest point of the cornea underlying peripheral portion 69 (point K in the embodiment of FIG. 5) will also determine the highest point of the transition between base curve 65 of the spherical section 66 of lens 60 and peripheral portion 69, subject to leaving the entire central (optical) zone with sufficient clearance from the cornea. The lowest point of the cornea along the base curve will determine the lowest point of the transition.

Figure 8:
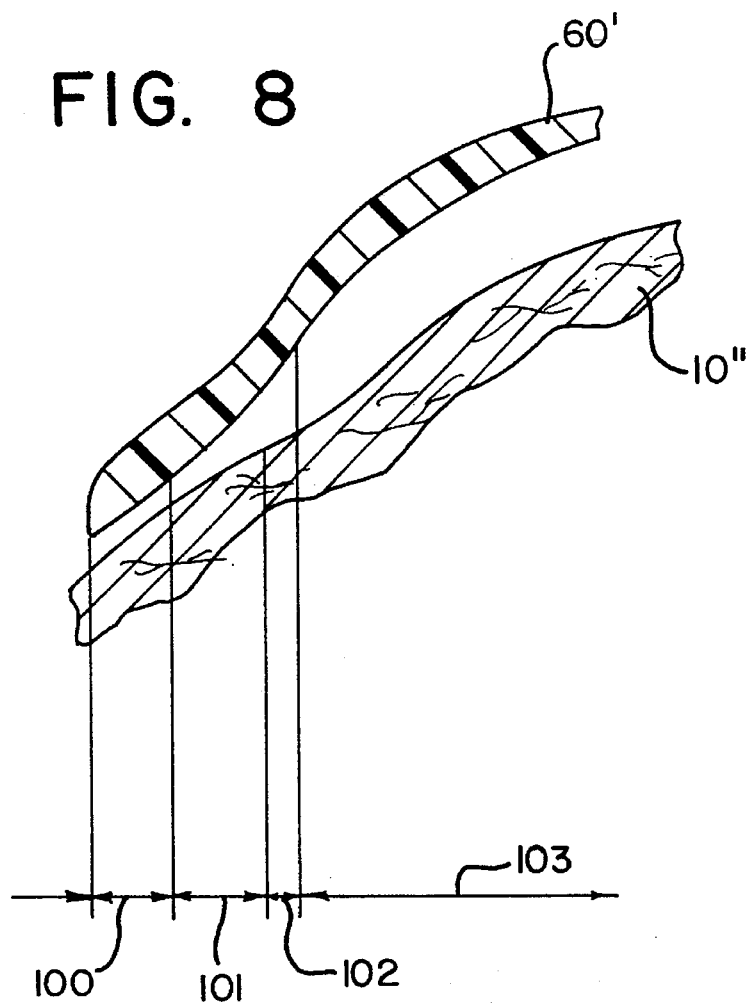
FIG. 8 is a partial cross-sectional view of an asymmetric aspherical cornea fitted with a combination spherical and asymmetric aspherical lens according to the invention in which a portion of the asymmetric aspherical posterior surface does not match the corneal surface but conforms to said surface in a proportionally divergent relationship.

FIG. 8 depicts a variation of a preferred embodiment of the present invention. The three zones 100, 101 and 102 in combination make up the peripheral area 69 in FIGS. 4 and 5. Zone 103 in FIG. 8 corresponds to the spherical central area 66 of FIGS. 4 and 5. As in the lens of FIGS. 4 and 5, the posterior surface of lens 60' in zone 100 matches the asymmetric aspherical cornea 10" (partially shown) in this same zone 100. Adjacent to zone 100 is an intermediate zone 101. The cornea 10" continues to remain asymmetrically aspherical. The portion of lens 60' in intermediate zone 101 is also asymmetrically aspherical, but does not match the corneal topography. The lens 60' in intermediate zone 101 conforms to the corneal topography in a predetermined proportionally divergent relationship. The amount by which the topography diverges from the true corneal topography will be determined by a simple algebraic formula such as: $Z'=Z+(X-5)/2$ where $Z'$ is new Z elevation of the lens, Z is the elevation of the lens without the divergence and X is the X coordinate of the location of the particular point on the lens (the X axis is parallel to the page of FIG. 8). The purpose of the intermediate divergent zone 101 on lens 60' is to control the flow of lachrymal fluid into and out of the gap between the lens 60' and the cornea 10". By increasing the amount of divergence, the capillary effect will be increased and therefore more fluid will flow tinder the 60'. Conversely, if the divergence is decreases (ultimately to the point where $Z'=Z$), the amount of fluid flow will decrease.

Zone 102 is a transition zone (not to scale) between the aspheric asymmetric portion of lens 60' and the central spherical portion of lens 60'. The purpose of the transition zone 102 is to provide a blended curve between the aspherical asymmetric portion (zones 100–102) and the spherical portion (zone 103)

Figure 9:
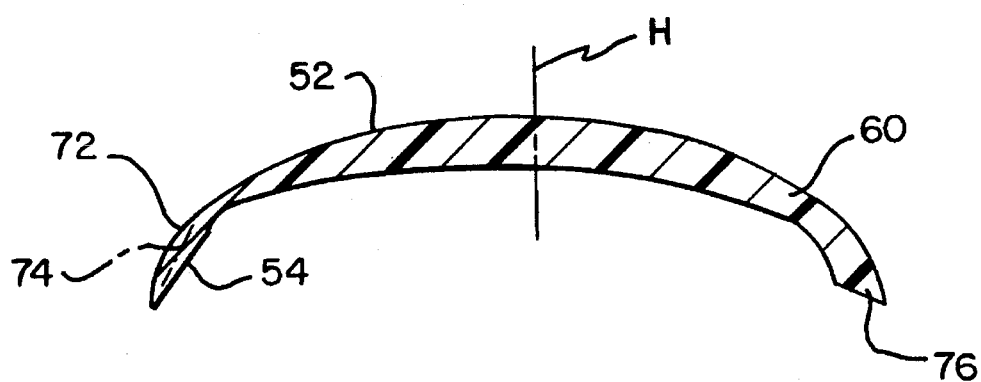
FIG. 9 is a sectional view taken along line 9—9 of FIG. 5.

FIG. 9 illustrates how the peripheral edge portion 69 of lens 60 has a variable thickness to permit for variations in an asymmetric aspherical cornea, while maintaining a conventional anterior edge and surface design. As illustrated in FIG. 9, the left half of the lens corresponds to the thinnest edge due to the cornea being the steepest in this area and the fight half corresponds to the thickest edge due to the cornea being the flattest in this area. If the edge is thinner than a predetermined minimum required thickness for lens structural strength (to avoid breakage during manufacture, the present invention will automatically compensate by providing additional thickness on the lens' anterior edge surface. This additional thickness provides for a sufficient thickness such that the edge has the shape of a conventional anterior edge. It should be noted that the anterior surface 52 of lens 60 illustrated in FIG. 9 is spherical. However, at least the rim portion 69 of the posterior surface 54 is asymmetrical and aspheric. Both the uncompensated edge 74 (shown in phantom) and the actual compensated edge 72 are illustrated in FIG. 9.

Figure 6:
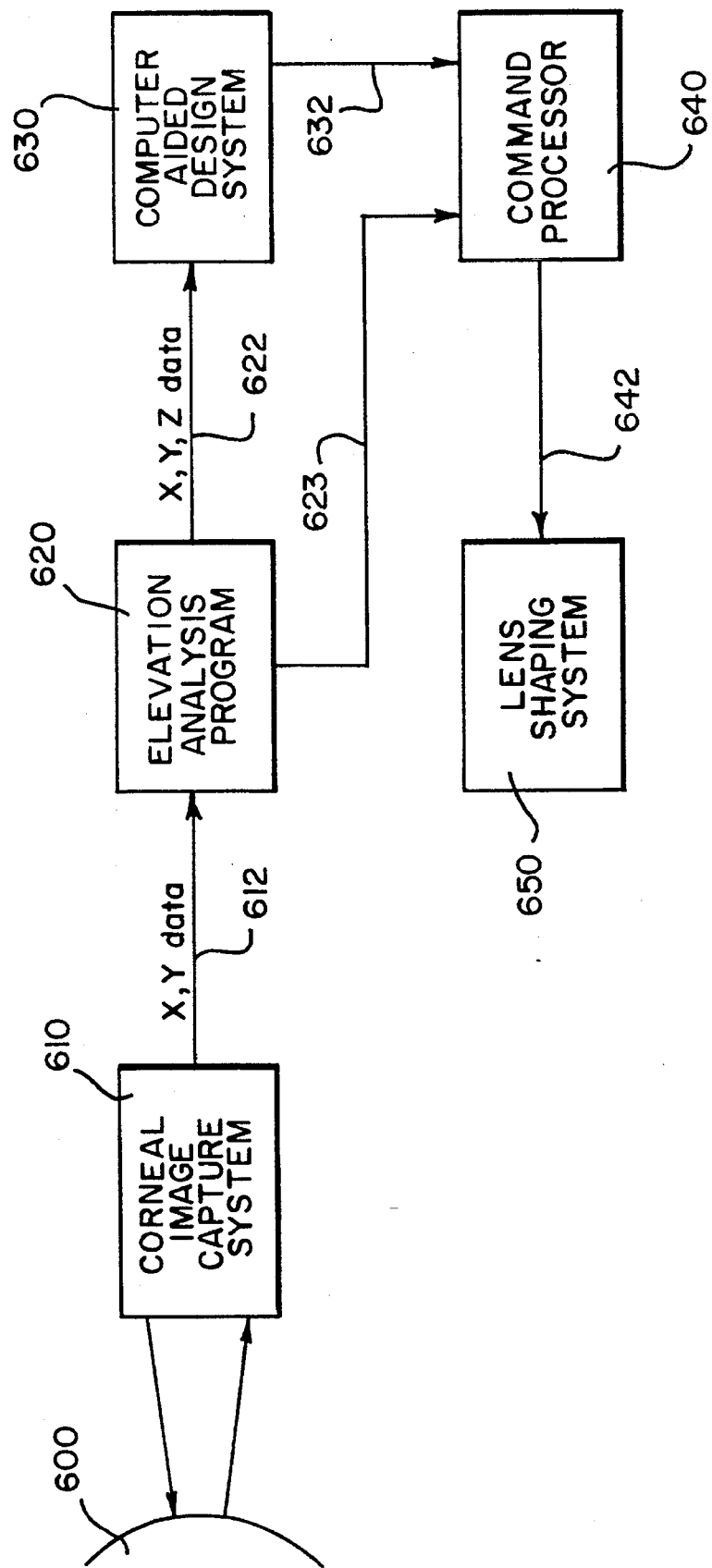
FIG. 6 depicts the overall system and data flow for a lens manufacturing process according to the present invention.

A system for manufacturing the asymmetric aspheric contact lens of the present invention is illustrated in FIG. 6. The system includes a Corneal Image Capture System 610, an Elevation Analysis Program 620, a Computer Aided Design System 630, a Command Processor 640 and a Lens Shaping System 650. The Corneal Image Capture System 610 is used in conjunction with the Elevation Analysis Program 620 in order to generate a three dimensional topographic map of the cornea 600 of the patient which is to be fitted with a contact lens. For this purpose, both slope (contour-line) and elevation data are necessary.

The Computer Aided Design System 630 is used as an aid in editing or modifying the corneal topographic data prior to sending the data to a Lens Shaping System 650 via the Command Processor 640. The Command Processor 640 takes the topographic data describing the surface of the lens to be shaped, either directly from the Elevation Analysis Program or from the Computer Aided Design System 630, and generates a sequence of commands/control signals required by the Lens Shaping System 650. The Lens Shaping System 650 accepts from the Command Processor 640, a sequence of commands which describe the movements in three dimensions (X, Y, Z in any one of cartesian, radial or spherical coordinates) of the Lens Shaping System to shape the particular custom fit contact lens.

Each of the systems described in FIG. 6 can be constructed as separate units, or certain of the systems can be combined and practiced on a single processor. For example, the Computer Aided Design System 630 and the Command Processor are both software applications which can be loaded and executed on a single Personal Computer (PC) such as an IBM™ compatible PC. Since the two applications do not have to run at the same time, a very advanced PC is not required, but preferably a computer with a 486 processor (or equivalent) is preferred for the math intensive Elevation Analysis Program. In one embodiment of the system of FIG. 6, the Corneal Image Capture System 610 and the Elevation Analysis Program 620 are located at a first location, such as a physician's office, while the Computer Aided Design System 630, Command Processor 640 and a Lens Shaping System 650 are all located at a second location, such as a manufacturing site. The links 622 and 623 can be accomplished via a telecommunications link, such as a modem or RS232 port (not pictured in FIG. 6) or merely by the passage of a diskette between the two systems. The Corneal Image Capture System 610 captures a two-dimensional image of the surface of the patient's cornea 600. System 610 captures the corneal image by projecting an illuminating pattern onto the surface of the cornea 600 and captures the light reflected off the corneal surface. Traditional methods of illuminating the cornea 600 involve projecting a series of calibrated concentric rings or mires such as described in U.S. Pat. No. 4,863,260. Although this patent describes one method of obtaining corneal topographic data, several topographic systems (cited below) might use different methods. Any of these commercial topographic mapping systems can be used in the present invention. Typically, ten to twenty rings are projected onto the cornea 600. But up to now this method could not be used to extract the true elevation of corneal points. The concentric ring method yields information only on the slope of the cornea between two points. A preferred method for determining X, Y, Z coordinates of corneal points involves a measurement of the elevation of each point not only derivation of elevation information based on two-dimensional dam. One of the commercially available systems for accomplishing this captures a two-dimensional image of the corneal surface on video tape. The two-dimensional image of the cornea is digitized, each pixel of the in, age having a set of X, Y coordinates and a "brightness" value e.g., between 0 and 256. A "brighter" pixel will have a higher value, which directly correlates with the higher elevation (not merely the slope) of the corresponding point on the cornea. The X and Y axes are centered about the optical centerline of the patient's eye (which, incidentally, is not necessarily coextensive with the geometric centerline of the cornea) when the image of the cornea 600 is captured.

The X-Y data representing the two dimensional image of the cornea 600 are passed, via data line 612, to a Elevation Analysis Program 620. If the Corneal Image Capture System 610 and Elevation Analysis Program 620 are constructed as an integral unit, then data line 612 can take the form of an internal data bus. Alternatively, the X-Y and "brightness" data can be stored in a common area of memory (not shown in FIG. 6) which is accessible to both the Corneal Image Capture System 610 and the Elevation Analysis Program 620.

The Elevation Analysis Program 620 is preferably a software program executed by a processor. The processor can be custom-designed or can also be an IBM™ compatible PC. The Program 620 uses an algorithm to generate a third dimension element, a Z coordinate, for each of the X-Y pairs of data based on the X-Y pair and the brightness of the pixel. One method of calculating the elevation of each point, i.e., the Z coordinate, is by comparing the X-Y and brightness values measured from the patient's cornea 600, to the coordinates and brightness of some reference surface with known elevation, e.g., a sphere of a known radius. (The reference values can be pre-stored in Program 620.) The final output of the Elevation Analysis Program are X-Y-Z coordinates for a multiplicity of points (preferably approximately 1500 or more) on the surface of the cornea 600. A greater number of X-Y-Z triplets enables even greater accuracy in the shaping of the contact lens as described below but is not necessary. It will be apparent to those skilled in the art that any method that can generate X, Y, Z corneal data providing both location and elevation information for points on the corneal surface with the required accuracy (in this embodiment about 1500 points randomly spaced on the corneal surface) could be used.

The X-Y-Z data output from the Elevation Analysis Program 620 can be formatted in any number of machine-specific ways all well within the skill of the art. In a preferred embodiment of the present invention, the data are formatted in a Data Exchange File format (DXF). The DXF format is an industry standard format which is typically used for the inter-application transfer of data. The DXF file is a ASCII data file which can be read by most of the commonly used Computer Aided Design Systems 630. The Computer Aided Design System 630 is used in the present manufacturing process in order to graphically present to the user (the attending physician or lens manufacturer) the topography of the cornea, and therefore the topography of the custom fit lens which is to be shaped to match the corneal topography. The Computer Aided Design System 630 also allows the user to edit the data and to generate new three-dimensional surfaces (e.g., a spherical surface as described below) derived from the actual corneal surface.

The routing of the X-Y-Z data from the Elevation Analysis Program 620 depends on the type of lens to be manufactured and the type of lens blank used as the starting material for the shaping process. If the lens to be manufactured is a fully contoured lens, shaped to conform to the cornea along the entire posterior surface, such as depicted in FIGS. 2 and 3, then the X-Y-Z data from the Elevation Analysis Program 620 can be passed directly to the Command Processor 640 without the need for modification or editing by the Computer Aided Design System 630. For shaping the anterior lens surface, the posterior lens surface data can be edited by System 630 to yield an anterior surface with the requisite eyelid interaction and optical correction, based on methods known in the art.

If the lens to be manufactured is a combination spherical and asymmetric aspheric lens as depicted in FIGS. 4 and 5, the X-Y-Z data contained in the DXF file from the Elevation Analysis Program 620 has to be edited and/or modified by the Computer Aided Design System 630. The DXF file passed to the Computer Aided Design System 630 contains data describing the entire surface of the cornea. If a spherical lens blank is used, the blank needs to be shaped to match the cornea only in the peripheral region (69 in FIGS. 4 and 5) which will be in contact with the cornea and, optionally, to conform to the cornea in an intermediate zone (101' in FIG. 8). Therefore, any data describing the topography of the cornea corresponding to the central spherical portion of the lens (66 in FIGS. 4 and 5) may be disregarded.

As stated previously, the base curve and the width of peripheral portion 69 of the lens can determined by the attending physician using the elevation and location of the apex of the cornea and the elevation and location of the highest and lowest points on the cornea within the area underlying the peripheral area 69. With the aid of the Computer Aided Design System 630 the base curve and its position are easily calculated. The base curve and position thus calculated can be optionally verified by the attending physician or manufacturing specialist before a lens blank with the calculated base curve is actually selected. In the embodiment described here, using a lens blank with the spherical base curve at the proper height, the Computer Aided Design System 630 will generate a DXF file which describes only the peripheral (asymmetric, aspherical) portion of the posterior lens surface between the base of the spherical portion and the base of the lens. Note that the peripheral portion of the anterior surface of this lens does not need to be reshaped based on vision correction considerations because the peripheral area of the contact lens is out of the optical field of the cornea. However, as stated above, reshaping of the peripheral portion of the anterior lens surface may be required to optimize lens/eyelid interactions, tear exchange and tear flow. The thus modified DXF file is then passed onto the Command Processor 640 for generating the commands which will actually guide the tool that will shape the lens in the peripheral portion.

It will be apparent to those skilled in the art that further editing of the X-Y-Z data may be required, e.g., for such variations as the embodiment of FIG. 8 to provide the "central zone" which bears a predetermined proportionally divergent relationship to the shape of the corresponding portion of the cornea. The relationship is determined based on the tear flow pattern through the cornea that is desired, taking into account the surface tension of the anterior lens surface and of the corneal surface as well as the viscosity of the lacrimal fluid and the capillary nature of the passage between the peripheral portion of the lens and the cornea.

An important advantage of the embodiment using a spherical lens blank is that the manufacturing cost and time of producing a custom fit contact lens is substantially decreased without sacrifice in comfort or visual acuity. The manufacturing facility is able to stock a variety of spherical lens blanks which have been pre-fabricated using less expensive techniques such as molding or spin casting. When a custom lens is ordered, the manufacturer merely has to select from its inventory a lens blank with the proper (e.g. spherical) base curve and optical lens power or powers required. It must be noted that the methods in this description relating the shaping of contact lenses also apply the shaping of molds which can be used to produce many other lenses.

An alterative embodiment for manufacturing a lens with a combination spherical central portion and asymmetric aspheric peripheral portion does not start with a spherical lens blank. In this embodiment, the base curve of the central spherical portion of the lens is determined (either by the attending physician or by the operator of the Computer Aided Design System 630) and the Computer Aided Design System 630 is employed to generate X-Y-Z data describing the topography of the spherical central portion. In this embodiment, the Computer Aided Design System 630 will generate a DXF file describing the entire surface, both posterior and anterior surfaces, of the lens which is then passed onto the Command Processor 640. In this manner both the anterior and posterior surfaces of the lens are shaped, pursuant to the information from the Command Processor including the central spherical portion. An advantage to this process is the ability to accommodate a cornea with a non-standard base curve, e.g. , for a patient with a keratoconus.

The Command Processor 640 accepts DXF files containing X-Y-Z data describing the surface of the lens to be shaped, and generates a sequence of commands which controls the Shaping System 650. The Command Processor 640 will take the raw X-Y-Z data from either the Elevation Analysis Program 620 or the Computer Aided Design System 630 and use the raw data to generate the control signals required to control Lens Shaping System 650 which then shapes lens blanks. The Command Processor 640 is adapted to Lens Shaping System 650 and both units are generally available from the manufacturers of the Lens Shaping System 650. One combination of Command Processor and Lens Shaping System is commercially available as the DLM Series II Micro Mill from DAC of Carpinteria, Calif. Systems incorporating both the Corneal Image Capture System 610 and the Elevation Analysis Program 620 are commercially available from companies such as Computed Anatomy (New York, N.Y.), EyeSys Technologies (Houston, Tex.), or PAR Technologies (New Hartford N.Y.) sold under trademarks or model numbers TMS1, Corneal Analysis System III (CAS III), and Corneal Topography System (CTS) respectively.

Computer Aided Design Systems such as 630 are commercially available under the tradenames AutoCAD™, AutoMILL™ and AutoSURF™ from Autodesk of Sausalito Calif. and CADKEY™ from Cadkey Inc., Manchester, Conn.

In a preferred embodiment of the present invention, the Lens Shaping System 650 is a three-centerline rotary encoded mill capable of movement in the X, Y and Z axes but other systems having the ability to shape lens blanks asymmetrically in three dimensions with a smooth transition (i.e., without sharp angles) could be used instead. Traditional lathing techniques are not adequate for this purpose because they do not have the accuracy or precision of an encoded miller. In addition, some laser techniques that ablate material from a lens blank may create pits on the lens surface and are therefor also not adequate. However, a conventional lathe may be used to form the spherical central portion.

Figure 7:
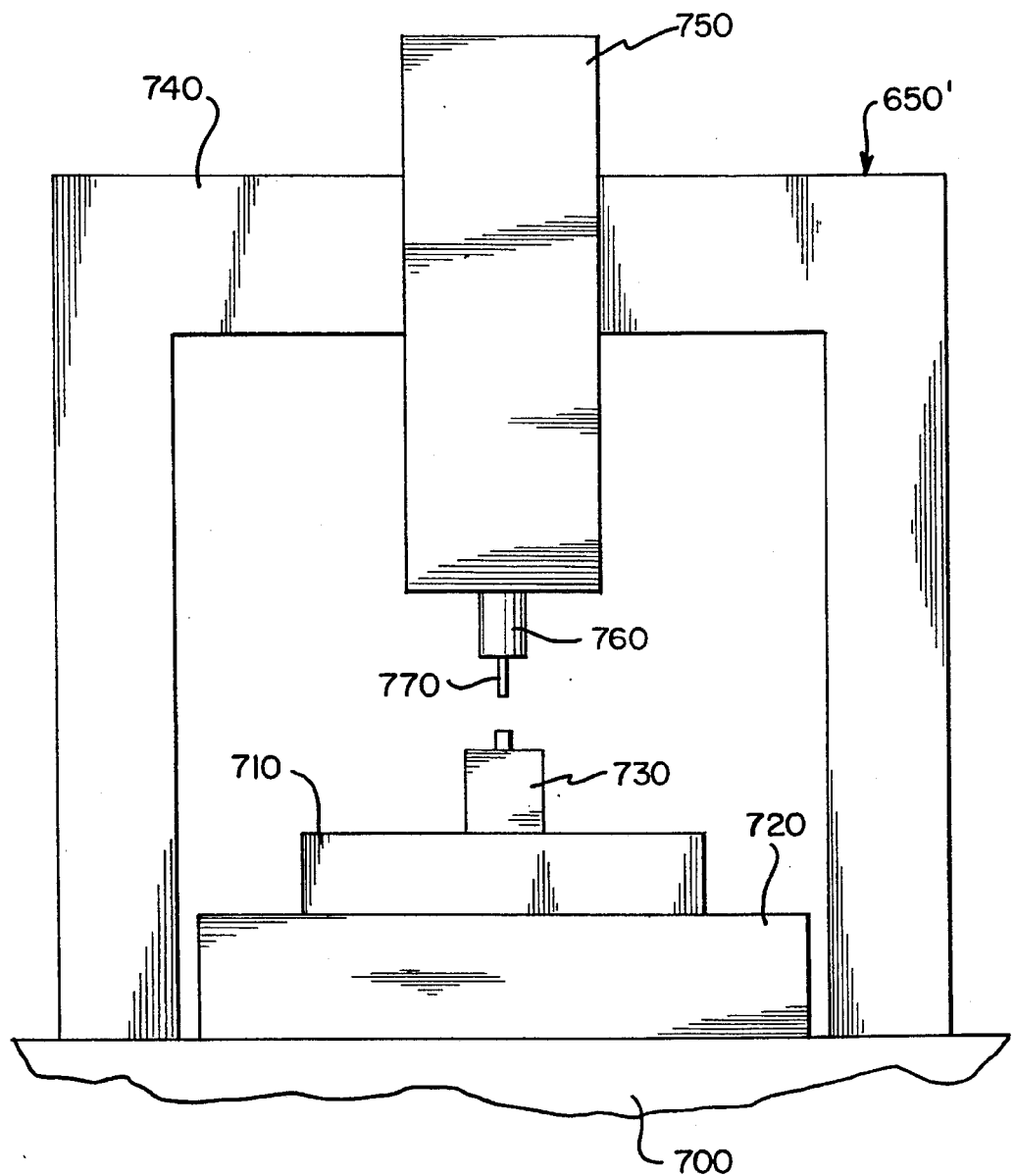
FIG. 7 is a milling system for use in manufacturing a contact lens according to the present invention.

Lens Shaping System 650 employing a milling tool or "miller" is depicted in FIG. 7. The milling system 650' rests on a stable work table 700 (preferably constructed from granite for stability). The surface plate 710 is mounted upon vibration isolator 720. A collet 730 for holding the lens blank is mounted on top of the surface plate 710. The surface plate 730 acts as an X-Y table, providing motion in the X and Y directions. Z axis operation is accomplished by vertical spindle 760. Vertical support frame 740 provides support for the spindle controls 750 and spindle 760. A milling tool 770 is shown mounted in the chuck of the spindle 760. The surface plate X-Y motion and the spindle Z direction motion is driven by crossed roller type bearings and ball screw feeds (not shown). Rotary encoders (not shown) are typically used to provide high resolution accuracy. The controller and associated electronics for the Milling System 650' is not shown in FIG. 7.

In operation, the lens blank which is to be milled is held in collet 730. Preferably, the lens blank is held in the collet by means of a vacuum system (not shown). The series of commands for controlling the X-Y motion of the X-Y table 710 and the Z motion of the spindle 760 are received from the Command Processor 640 (FIG. 6). As stated previously, the Command Processor 640 is adapted to the particular milling system 650'. The commands are formatted and properly sequenced for use by the mill controller. The mill controller generates the actual control signals which drive the X-Y notion of the surface plate 710 and the Z axis motion of the spindle 760. The System 650' allows vertical translation of the Z axis in coordination with the movement of the X-Y table 710. Contrary to a conventional lathing system, in which the workpiece is rotated, the lens blank on the milling system 650' remains stationary with respect to the X-Y table 710 and the Z centerline spindle 760. Since the lens blank remains stationary, the three-centerline milling system 650 is able to control the X, Y and Z motion of the milling tool 770 relative to the lens blank and thereby create a contact lens having at its posterior surface an asymmetric aspheric peripheral portion (or, alternatively, an entire posterior surface) that is asymmetric and aspherical and either matches the corneal surface for which it is custom designed or conforms to the corneal surface according to a predetermined relationship. In the preferred embodiment of the milling process, the milling tool will travel in a composite fashion consisting of a translational component and a circumferential component over the stirface of the lens to be milled. The resulting spiral motion will provide a smooth and blended curvature of the surface of the lens. The circumferential milling process is known as "climb". Any milling process will inherently create ridges in the surface of the material being milled. If the ridges are as high as 3μ (hill to valley) they create discomfort. Applicant has discovered that by milling the lens in a circumferential manner, as opposed to a radial manner (known as "raster"), the height of the ridges can be greatly reduced (preferably to less than 2μ and most preferably to 1μ hill-to-valley). In fact, the height of the ridges are negligible, which Applicant believes is partly due to the fact that the radial step of the miller between circumferential cuts is preferably very small (i.e., between 0.1 mm and 0.000001 mm). For those embodiments calling for shaping all or part of the anterior lens surface, analogous shaping operations will also be performed on that surface based on the teachings provided herein.

Although traditional lenses are necessarily circular in shape (because of the rotational cutting), no such limitation exists using the shaping techniques and data of the present invention. For this reason, virtually any shape lens can be milled, including an oval (ellipsoidal) shaped lens. The variety of lens shapes enabled by use of the present invention allow practitioners to develop new approaches to solving the lens/eyelid interaction problem. The interaction of the eyelid with a contact lens has traditionally been a problem with contact lenses. As the eyelid closes, it tends to impact the edge of the lens and displace the lens from its centered position. By using a lens shape other than circular, such as an oval shape, the force of the eyelid will be distributed along a longer edge of the contact lens and therefore the lens will have less of a tendency to be displaced. Alternatively, if an oval shaped lens is used, the wider diameter of the oval can be oriented along the vertical meridian of the cornea (i.e., from twelve o'clock to 6 o'clock). Although this orientation will expose the narrowest portion of the lens to the initial contact with the eyelid (which is believed to concentrate the forces from the eyelid to a narrow portion of the lens) the narrow portion will also be supported by the greatest amount of bearing surface. It is anticipated that a noncircular lens design will assist in alleviating, if not preventing, the lens from being dislodged by the action of the eyelid.

The asymmetric aspheric posterior surface or surface portion of the contact lens of the present invention, which matches the asymmetric aspheric contour of the cornea, enables the lens to sit much more securely on the cornea and rotate less with respect to the cornea, than any lens of the prior art. This advantage of the present invention has several aspects. First, as described above, the eyelid tends to displace the lens when the wearer blinks. Because the lens of the present invention has a secure seat on the cornea, this displacement is much less likely. Even if the lens does become displaced, surface tension forces will cause it to resume its proper placement (i.e., "centered" position) much more quickly and accurately than any lens of the prior art. Symmetric aspheric lenses of the prior art require a ballast or "weight", usually an additional mass of lens material, in the inferior quadrant of the lens (the six o'clock position of the lens) in order to properly orient the lens on the cornea. By the force of gravity, when the patient is upright, the heavier part of the prior art lens tends to rotate to the inferior quadrant of the cornea. In the lens of the present invention, the custom asymmetric contour of the lens will cause the lens to stay centered on the cornea, without the need for a ballast to orient the lens through the operation of gravity. The matched contours of the lens and cornea acts as a "key" to properly center the lens on the cornea.

A further advantage of the self aligning or self-centering aspect of the lens of the present invention occurs in the application of bi- or multifocal lenses. There are two types of such lenses in the prior art: in the first, the portion of the bi-or multifocal lens that is of a higher power than the rest of the lens is found in the inferior quadrant. In the second type, the central portion of the bi- or multifocal lens is set for distance and the power progressively increases in a radial direction. In order to orient the lens of the first type properly, the practice in the prior art is to place a ballast in the inferior quadrant to allow gravity to orient the lens. As stated above, if the patient is in an inclined position (e.g. reading in bed), the effect of gravity upon the lens is misdirected and the lens has a tendency to rotate and float away from its aligned position. The second type of bifocal or multifocal lens requires no ballast but provides a smaller central field of vision. The first type of bifocal or multifocal lens is preferred in the present invention. Since the lens of the present invention does not need a ballast for alignment, the wearer can assume any position without the lens becoming displaced or rotate from its aligned position. Furthermore, if the bi- or multifocal lens of the invention does become displaced, the lens, floating on the tear film will quickly self align in its proper position on the cornea.

The present invention encompasses soft, hard or gas-permeable contact lenses made without limitation from a variety of commercially available materials, such as hydrophilic polymers (e.g., hydrogels), poly(methyl methacrylate), or rigid gas-permeable polymeric materials such as fluoro-silicone acrylate (Polymer Technology), flexible fluoro polymers (e.g., A-FPP from Ocular Sciences), siloxane acrylate (CooperVision), stryisilicone (Ocutec), 1-butyl styrene/silicone acrylate (PBH), polysulfone-fluoro silicone acrylate (Progressive Optical Research) and fluoropolymer (American Hydron) which are preferred.

Having thus described a preferred embodiment of the present invention, it is to be understood that the above described device and method is merely illustrative of the principles of the present invention, and that other devices may be devised by those skilled in the art without departing from the spirit and scope of the invention as claimed below.

I claim:

1. A contact lens for use on a patient's eye with an asymmetric aspheric cornea, said lens having: an anterior surface, a posterior surface and a base, said posterior surface comprising a peripheral portion, which is asymmetric and aspherical and at least coextensive with the base of said lens, said base comprising an edge of variable thickness;

said peripheral portion asymmetrically and aspherically matching a corresponding peripheral portion of the cornea which lies under said peripheral portion of the lens when the lens is worn in the patient's eye; and said contact lens having a diameter that is less than or substantially equal to a diameter of said cornea.

2. The lens of claim 1 wherein said peripheral portion is coextensive with the base of said lens.

3. The lens of claim 1 wherein said peripheral portion has a width up to about 1.5 mm.

4. The lens of claim 1 wherein said peripheral portion has a width up to about 1 mm.

5. The lens of claim 1 wherein said posterior surface further comprises a central portion that is spherical.

6. The lens of claim 5 wherein at least a portion of said anterior surface is asymmetric and aspherical and bears a predetermined relationship to said posterior surface, said relationship having been determined by taking into account the optical correction to be achieved by said lens.

7. The lens of claim 5 wherein said anterior surface has a central portion and at least the central portion of said anterior surface is spherical.

8. The lens of claim 1 wherein said base is non-circular.

9. The contact lens according to claim 1 wherein said lens is at most about 10 millimeters in base diameter.

10. The contact lens of claim 1 wherein said lens has superior and inferior quadrants, said lens further comprising:

a portion of said inferior quadrant of said lens has a power different from the power of said superior quadrant.

11. The contact lens of claim 10 wherein said portion of said inferior quadrant of said lens has a plurality of different powers.

12. The lens of claim 1 wherein the posterior surface of said lens further comprises a central portion and an intermediate zone between said central portion and said peripheral portion, said intermediate zone being asymmetric and aspherical, said intermediate zone asymmetrically and aspherically conforming to a corresponding intermediate zone of said cornea, according to a predetermined proportionally divergent relationship, thereby providing progressively increasing spacing between said lens and said cornea along the width of said intermediate zone from said peripheral portion to said central portion.

13. The lens of claim 12 wherein said peripheral portion has a width up to about 1 mm.

14. The lens of claim 12 wherein said central portion is spherical.

15. A contact lens for use with an asymmetric aspherical cornea, said lens having:

an anterior surface, a posterior surface and a base, said posterior surface comprising a peripheral portion, which is asymmetric and aspherical and at least coextensive with the base of said lens, said base comprising an edge of variable thickness;

at least said peripheral portion asymmetrically and aspherically matching a corresponding portion of the cornea; and said contact lens having a diameter that is less than or substantially equal to a diameter of said cornea.

16. The lens of claim 15 wherein the posterior surface further comprises a central portion, said central portion being no more than about 7 millimeters in base diameter.

17. A contact lens having a base, first and second meridians, a geometric center, and anterior and posterior surfaces, said surfaces each having a central portion and a peripheral portion, said posterior surface peripheral portion being at least coextensive with the base, said contact lens comprising, said base comprising an edge of variable thickness:

said central portion of each of said posterior and anterior surfaces being spherical, said central portion of said anterior surface having an apex;

a first point on said peripheral portion of said posterior surface, said first point lying along said first meridian a predetermined radial distance from said geometric center of said contact lens;

a second point on said peripheral portion of said posterior surface, said second point lying along said second meridian at the same predetermined radial distance from said geometric center of said contact lens; and said first and second points are at different distances from a plane tangent said lens at said apex.

18. A method for making a contact lens having a posterior surface comprising a central portion and a peripheral portion comprising the steps of:

generating three-dimensional topographic data, including elevation data, for a multiplicity of points on a corneal surface to be fitted with said contact lens, said data providing information on both asphericity and asymmetry of said corneal surface;

generating a lens-shaping file based on said data, and on the optical correction to be achieved by said lens;

using said lens-shaping file to shape a lens blank to produce a contact lens having a posterior surface, said posterior surface comprising a peripheral portion which is asymmetric and aspherical and at least coextensive with the base of said lens, said base comprising an edge of variable thickness;

said peripheral portion asymmetrically and aspherically matching a corresponding peripheral portion of the cornea which lies under a corresponding peripheral portion of the lens when the lens is placed in its worn position in the patient's eye; and said contact lens having a diameter that is less than or substantially equal to a diameter of said cornea.

19. The method of claim 18 wherein said peripheral portion extends from the base of said peripheral portion to the base curve of said central portion.

20. The method of claim 18, said lens further having an intermediate zone between said peripheral portion and the base curve of said central portion said intermediate zone conforming according to a predetermined proportionally divergent relationship to the three-dimensional shape of an intermediate corneal surface portion that underlies said intermediate zone when the lens is worn on said cornea.

\* \* \* \* \*